United States Patent
Shiina et al.

(10) Patent No.: US 12,074,640 B2
(45) Date of Patent: Aug. 27, 2024

(54) TERMINAL DEVICES, COMMUNICATION METHODS, AND COMMUNICATION SYSTEMS

(71) Applicant: NIPPON TELEGRAPH AND TELEPHONE CORPORATION, Tokyo (JP)

(72) Inventors: Ryota Shiina, Musashino (JP); Tomohiro Taniguchi, Musashino (JP); Kazutaka Hara, Musashino (JP); Shinya Tamaki, Musashino (JP); Tomoki Murakami, Musashino (JP); Toshiro Nakahira, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 156 days.

(21) Appl. No.: 17/785,370

(22) PCT Filed: Dec. 16, 2019

(86) PCT No.: PCT/JP2019/049198
§ 371 (c)(1),
(2) Date: Jun. 14, 2022

(87) PCT Pub. No.: WO2021/124406
PCT Pub. Date: Jun. 24, 2021

(65) Prior Publication Data
US 2023/0025646 A1    Jan. 26, 2023

(51) Int. Cl.
*H04B 10/114* (2013.01)

(52) U.S. Cl.
CPC ............................ *H04B 10/114* (2013.01)

(58) Field of Classification Search
CPC .............. H04B 10/114; H04B 10/1143; H04B 10/1149; H04B 10/116
See application file for complete search history.

(56) References Cited

U.S. PATENT DOCUMENTS

| | | | |
|---|---|---|---|
| 7,543,052 B1 * | 6/2009 | Cesa Klein | H04L 43/026 709/224 |
| 2011/0052214 A1 * | 3/2011 | Shimada | H04B 10/1141 398/202 |

(Continued)

FOREIGN PATENT DOCUMENTS

| CN | 107180250 | * | 9/2017 | .......... H04B 10/116 |
|---|---|---|---|---|
| JP | 2003218791 A | | 7/2003 | |

(Continued)

*Primary Examiner* — Nathan M Cors
(74) *Attorney, Agent, or Firm* — Harness, Dickey & Pierce, P.L.C.

(57) ABSTRACT

An object is to provide a terminal device, a communication method, and a communication system which are capable of acquiring accurate optical ID information regardless of the position of the terminal device and the light receiving angle. The terminal device, the communication method, and the communication system according to the present invention each sets a threshold value for the illuminance of a received optical signal by using a moving average method, a weighted moving average method, or an exponential moving average, so that the optical signal can be binarized with a threshold value according to a change in the position of the terminal device, the light receiving angle, or the like. Information from other sensors may be used to set the threshold value.

14 Claims, 12 Drawing Sheets

(56) References Cited

U.S. PATENT DOCUMENTS

| | | |
|---|---|---|
| 2012/0128367 A1 | 5/2012 | Yamada |
| 2013/0234850 A1* | 9/2013 | Lee .................... A61B 5/6898 |
| | | 340/539.12 |
| 2018/0088208 A1* | 3/2018 | Gagrani .............. H04W 64/003 |
| 2018/0139202 A1 | 5/2018 | Sethi et al. |

FOREIGN PATENT DOCUMENTS

| | | |
|---|---|---|
| JP | 2009219032 A | 9/2009 |
| WO | WO-2011080867 A1 | 7/2011 |

* cited by examiner

Fig. 7

| SERIAL No. | OPTICAL ID | CONNECTION OPERATION AND AUTHENTICATION INFORMATION FOR RF COMMUNICATION | | | | | |
|---|---|---|---|---|---|---|---|
| | | PROTOCOL | FREQUENCY | CHANNEL | SSID | PASSWORD | PRIORITY |
| 1 | 111010 | 802.11n | 2.4GHz | ... | ... | ... | 2 |
| 2 | 000101 | 802.11ac | 5GHz | ... | ... | ... | 1 |
| ... | | | | | | | |

Fig. 12

| | ACCELERATION SENSOR INFORMATION $x,y,z$ (m/s²) | | | | GYRO SENSOR INFORMATION $x,y,z$ (rad/s) | MAGNETIC SENSOR INFORMATION $x,y,z$ (µT) |
|---|---|---|---|---|---|---|
| | $0 \leq x < 1$ or $0 \leq y < 1$ or $0 \leq z < 1$ | $1 \leq x < 3$ or $1 \leq y < 3$ or $1 \leq z < 3$ | $3 \leq x < 5$ or $3 \leq y < 5$ or $3 \leq z < 5$ | $5 \leq x$ or $5 \leq y$ or $5 \leq z$ | ... | ... |
| | | | | | ... | ... |
| $\alpha$ SETTING VALUE | 0.2 | 0.4 | 0.7 | 0.9 | ... | ... |

TERMINAL DEVICES, COMMUNICATION METHODS, AND COMMUNICATION SYSTEMS

CROSS-REFERENCE TO RELATED APPLICATIONS

This application is a 371 U.S. National Phase of International Application No. PCT/JP2019/049198, filed on Dec. 16, 2019. The entire disclosure of the above application is incorporated herein by reference.

TECHNICAL FIELD

The present disclosure relates to an optical/RF wireless hybrid communication between a base station and a terminal device.

BACKGROUND ART

In the description herein, a direction from a base station to a terminal device is referred to as a "downlink", and a direction from a terminal device to a base station is referred to as an "uplink".

For a wireless communication system such as Wi-Fi, there is known an optical/RF wireless hybrid communication in which connection authentication data such as an SSID and a password (PW) required for connecting a base station and a terminal device is notified to the terminal device by using an optical wireless communication (downlink communication using an LED lighting or the like) (e.g., see PTL 1). The optical/RF wireless hybrid communication has an advantage of allowing the terminal device user to connect to the Wi-Fi just by entering an optical wireless communication area without grasping the SSID and PW and then performing an operation for inputting them or the like.

CITATION LIST

Patent Literature

[PTL 1] U.S. Patent Application Publication No. 2018/0139202

SUMMARY OF THE INVENTION

Technical Problem

In the optical/RF wireless hybrid communication, instead of connection and authentication information itself for the RF communication is not transmitted by the optical wireless communication, an optical ID having a small amount of data corresponding to the information is transmitted. The optical transmitter of the base station transmits data with a color or brightness change under conditions that humans cannot perceive the optical ID. Both the base station and the terminal device have a correspondence list between the optical ID and the connection and authentication information, and the terminal device extracts the connection and authentication information corresponding to the received optical ID from the correspondence list and performs an RF communication according to that information.

Such an optical/RF wireless hybrid communication has an advantage that a light source for both optical wireless communication and lighting can be used in the base station and a standard device such as smartphone can be used as the terminal device because the connection and authentication control for RF communication is performed using optical signals. It also has an advantage of reducing equipment installation costs and power consumption.

In connection and authentication operation using an optical ID, a terminal device such as a smartphone reads a change in light illuminance or a change in color by using its own illuminance sensor, and performs binary conversion on the change based on a certain threshold value to receive optical ID information. However, the absolute value of the received light illuminance varies depending on the position of the terminal device and the light receiving angle. The light illuminance fluctuates according to the distance from the light source, and has, for example, a large absolute value at a position close to the light source. Therefore, the optical/RF wireless hybrid communication, in which the terminal device reads the change in light illuminance based on a fixed threshold value, has a problem that erroneous detection occurs depending on the position of the terminal device and the light receiving angle, making it difficult to acquire accurate optical ID information.

FIG. 8 is an illustration for explaining a problem to be solved by the present invention. A terminal device 30 binarizes an optical signal from a base station 20 by using a threshold value $p_{th}$. It is assumed that the terminal device 30 is in a communication area 40 of the base station 20. In this situation, the high level of the illuminance of the optical signal is above the threshold value $p_{th}$, and the low level of the illuminance of the optical signal is below the threshold value $p_{th}$, so that the terminal device 30 can binarize the optical signal. However, it is assumed that the terminal device 30 moves to the vicinity of the base station 20 at a certain time T. Then, the illuminance of the optical signal received at the terminal device 30 becomes generally higher. Accordingly, both the high and low levels of the illuminance of the optical signal are above the threshold value $p_{th}$, so that the terminal device 30 fails to binarize the optical signal, and as a result, erroneous detection occurs.

Therefore, in order to solve the problems described above, an object of the present invention is to provide a terminal device, a communication method, and a communication system which are capable of acquiring accurate optical ID information regardless of the position of the terminal device and the light receiving angle.

Means for Solving the Problem

In order to achieve the above object, a terminal device according to the present invention includes a mechanism for periodically updating a threshold setting according to a change in position of the terminal device, light receiving angle, or the like, and reading a change in light illuminance.

Specifically, a terminal device according to the present invention is a terminal device that communicates with a base station by an optical wireless communication and an RF (Radio Frequency) wireless communication, and includes:

an optical sensor that receives an optical signal of the optical wireless communication from the base station;
a calculation unit that samples an illuminance of the optical signal to acquire a sampling value, and calculates a threshold value for binarizing the optical signal based on transition of the sampling value; and
a determination unit that binarizes the optical signal based on the threshold value.

Further, a communication method according to the present invention is a communication method for performing communication between a terminal device and a base station by an optical wireless communication and an RF (Radio Frequency) wireless communication, the communication method including:
by the terminal device,
receiving an optical signal of the optical wireless communication from the base station;
sampling an illuminance of the optical signal to acquire a sampling value;
calculating a threshold value for binarizing the optical signal based on transition of the sampling value; and
binarizing the optical signal based on the threshold value.

Further, a communication system according to the present invention is a communication system in which communication between a terminal device and a base station is performed by an optical wireless communication and an RF (Radio Frequency) wireless communication, wherein
the terminal device includes:
an optical sensor that receives an optical signal of the optical wireless communication from the base station;
a calculation unit that samples an illuminance of the optical signal to acquire a sampling value, and calculates a threshold value for binarizing the optical signal based on transition of the sampling value; and
a determination unit that binarizes the optical signal based on the threshold value.

According to the terminal device, the communication method, and the communication system according to the present invention, a threshold value is changed based on the transition of the illuminance of a received optical signal, so that the optical signal can be binarized with the threshold value according to a change in the position of the terminal device, the light receiving angle, or the like. Therefore, according to the present invention, it is possible to provide a terminal device, a communication method, and a communication system which are capable of acquiring accurate optical ID information regardless of the position of the terminal device and the light receiving angle.

For example, the calculation unit calculates the threshold value by a moving average method, a weighted average method, or an exponential moving average method, which each uses a plurality of sampling values sampled in the past.

The terminal device according to the present invention further includes a sensor that acquires physical information other than the illuminance of the optical signal, and the calculation unit changes a smoothing constant used in the exponential moving average method based on sensor information output from the sensor.

The terminal device according to the present invention further includes:
a list describing a correspondence between ID information and authentication information for starting the RF wireless communication;
an analysis unit that refers to the list for the ID information obtained by the determination unit binarizing the optical signal to acquire the corresponding authentication information; and
an RF transmission and reception unit that transmits the authentication information acquired by the analysis unit to the base station by the RF radio communication.

Note that the above inventions can be combined as much as possible.

Effects of the Invention

According to the present invention, it is possible to provide a terminal device, a communication method, and a communication system which are capable of acquiring accurate optical ID information regardless of the position of the terminal device and the light receiving angle.

BRIEF DESCRIPTION OF DRAWINGS

FIG. 7 illustrates a correspondence list of the terminal device according to the present invention.
FIG. 12 illustrates processing in a calculation unit of the terminal device according to the present invention.

DESCRIPTION OF EMBODIMENTS

Figure 1:
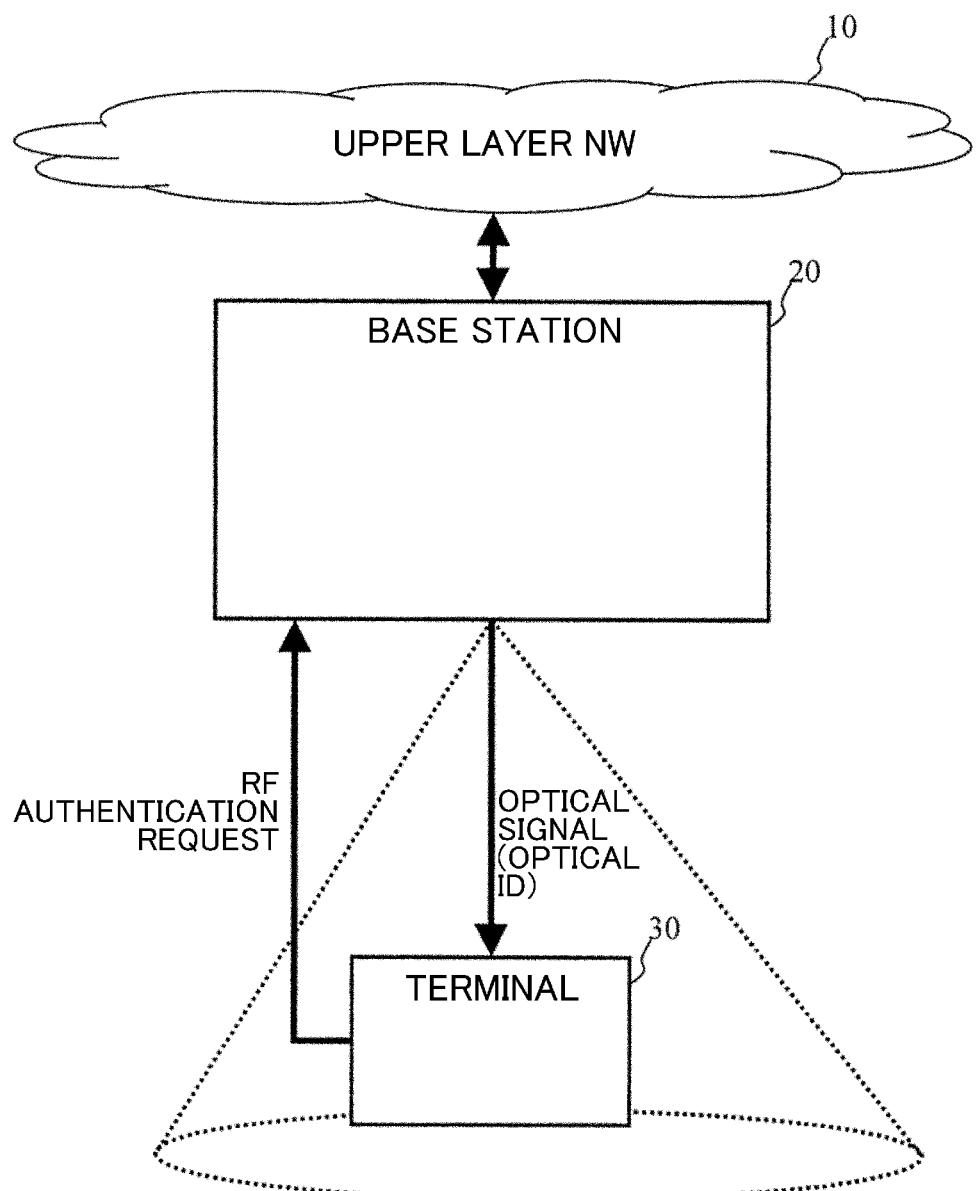
FIG. 1 is a diagram illustrating a communication system according to the present invention.

Embodiments of the present invention will be described with reference to the accompanying drawings. The embodiments described below are examples of the present invention, and the present invention is not limited to the following embodiments. Note that, in the description herein and the drawings, the components having the same reference numerals indicate the same components.

First Embodiment

FIG. 1 is a diagram illustrating a communication system 301 according to a first embodiment. The communication system 301 is a communication system that performs communication between a base station 20 and a terminal device 30 by an optical wireless communication and an RF wireless communication.

The base station 20 transmits as an optical signal an optical ID corresponding to connection and authentication information for RF transmission and reception to the terminal device 30 that is present in a predetermined area 40.

The terminal device 30 uses the connection and authentication information for RF transmission and reception corresponding to the received optical ID to transmit an authentication request to an appropriate base station 20.

Figure 2:
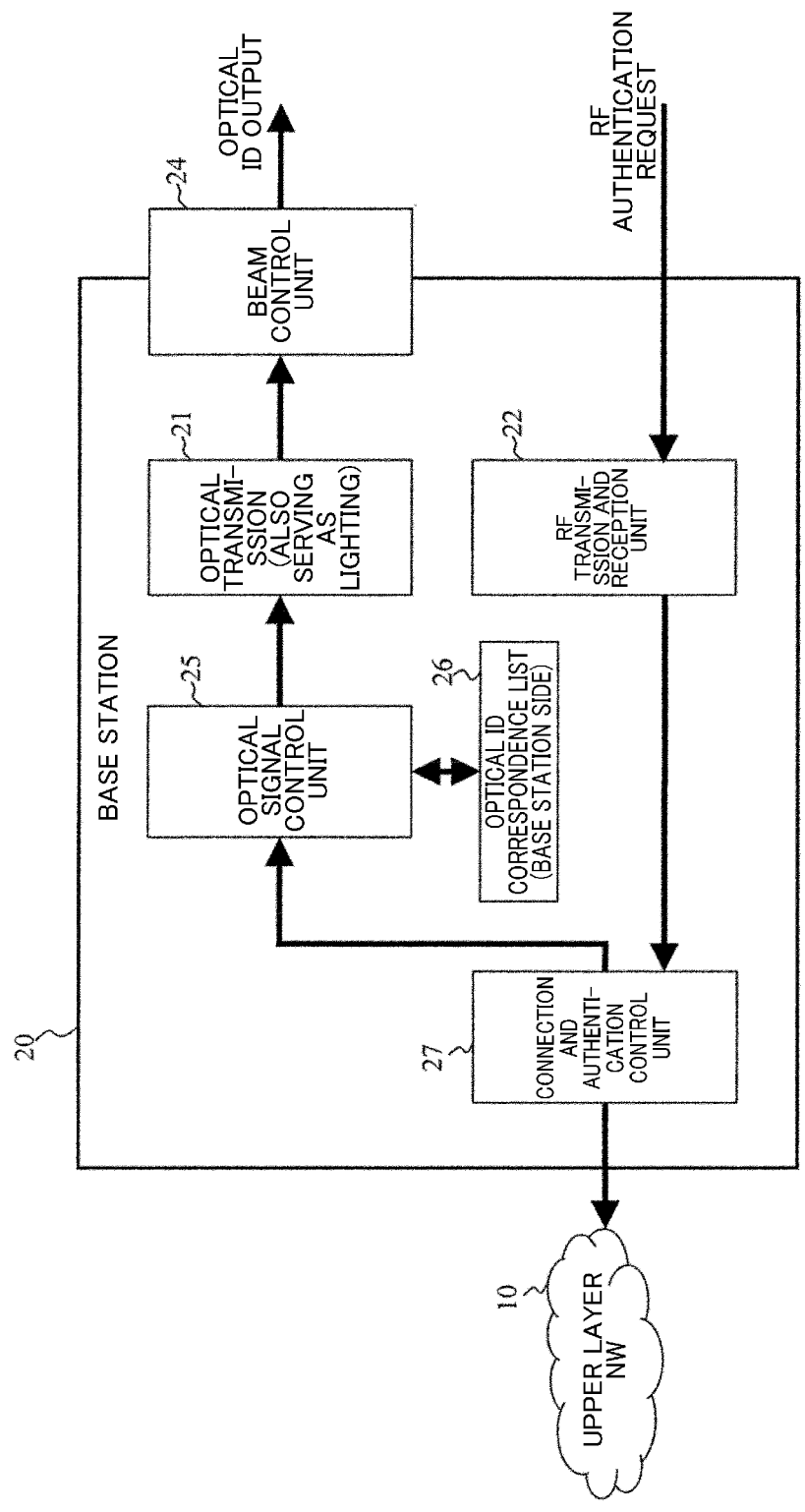
FIG. 2 is a diagram illustrating a configuration of a base station of the communication system according to the present invention.

FIG. 2 is a diagram illustrating a configuration of the base station 20. The base station 20 includes an optical transmitter 21, an RF transmission and reception unit 22, a beam control unit 24, an optical signal control unit 25, an optical ID correspondence list 26, and a connection and authentication control unit 27.

The connection and authentication control unit 27 manages connection operation and authentication information for RF communication. Note that the connection operation refers to what type of wireless protocol/IF is permitted and prioritized for connection. The authentication information refers to information such as an SSID (Service Set Identifier), an ID (identification number), a password, and the like. Further, the connection and authentication control unit 27 receives an RF authentication request from the terminal device 30, and permits the terminal device 30 for which it has been confirmed that the authentication information in the request matches the authentication information held by the connection and authentication control unit 27 to communicate with an upper layer NW 10.

The optical signal control unit 25 refers to the optical ID correspondence list 26 for the connection operation and authentication information notified from the connection and authentication control unit 27, and extracts the corresponding optical ID. Then, the optical signal control unit 25 modulates a signal with a signal pattern for the extracted optical ID. A modulation condition for this modulation is that the output light from the optical transmission unit 21 cannot be perceived by humans. Note that the optical ID correspondence list 26 is a list in which the connection operation and authentication information for RF transmission and reception and the optical ID are associated with each other.

The optical transmitter 21 uses a light source such as an LED that can be dimmed or toned. The light source may also serve as a lighting application. The optical transmitter 21 converts the optical ID (modulated signal) from the optical signal control unit 25 into an optical signal having a predetermined wavelength, power, modulation method, or data rate. In the present embodiment, a case will be described in which the optical transmitter 21 transmits an optical signal (an optical signal modulated with an optical ID under the above condition) so that the illuminance is equal to or higher than a certain level within the predetermined area 40.

The beam control unit 24 controls the beam shape so that the optical signal from the optical transmitter 21 can reach the predetermined area 40, and then transmits the optical signal to the space. If there are no obstacles that block the light, the optical signal reaches all terminal devices 30 in the predetermined area 40.

The RF transmission and reception unit 22 transmits and receives RF signals using a predetermined protocol (Wi-Fi, LTE, etc.). The RF transmission and reception unit 22 may support a plurality of wireless standards (Wi-Fi 2.4 GHz/5 GHz, etc.).

Figure 3:
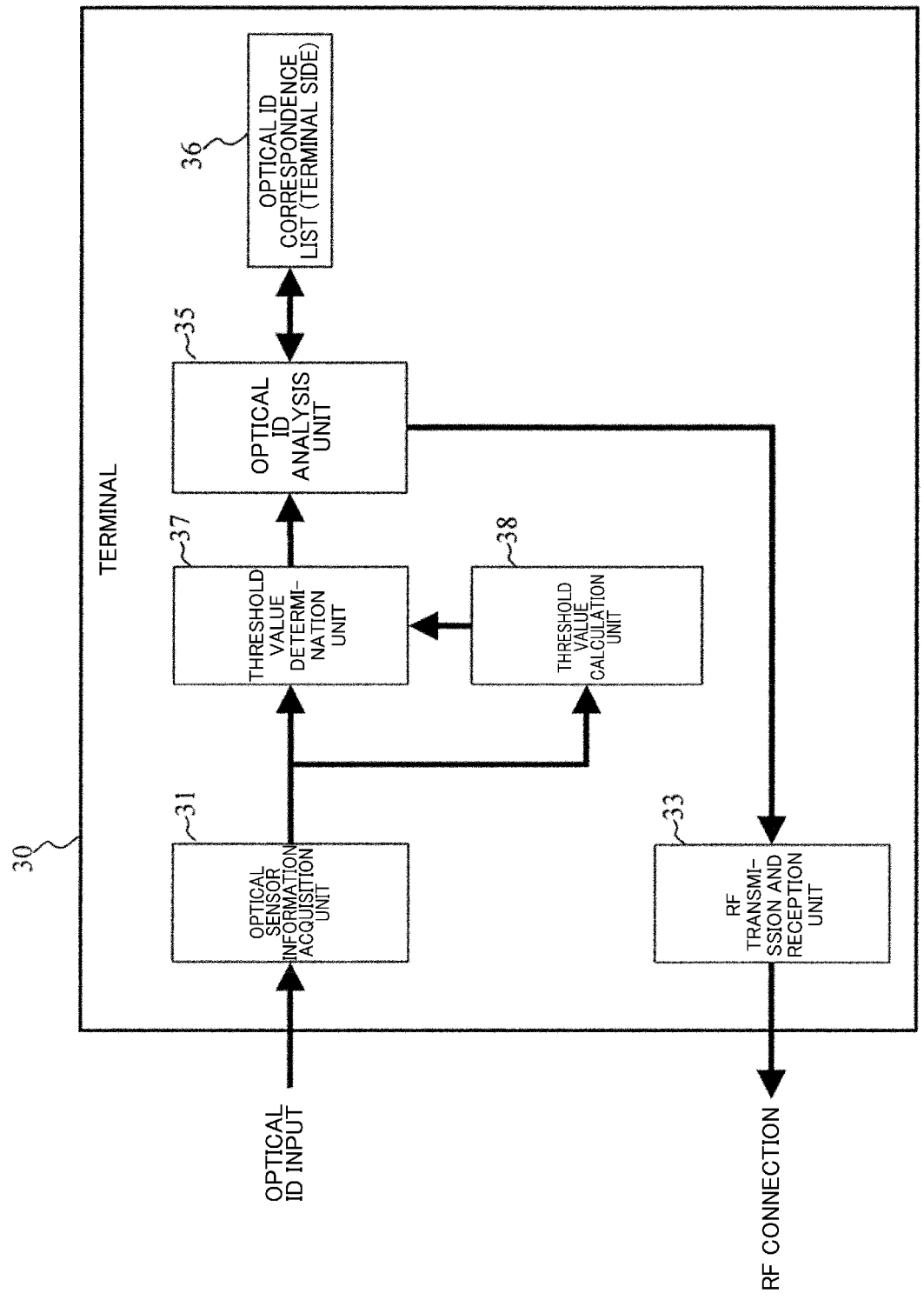
FIG. 3 is a diagram illustrating a configuration of a terminal device of the communication system according to the present invention.

FIG. 3 is a diagram illustrating a configuration of the terminal device 30. The terminal device 30 includes:

an optical sensor (an optical sensor information acquisition unit 31) that receives an optical signal of the optical wireless communication from the base station 20;

a calculation unit (a threshold value calculation unit 38) that samples an illuminance of the optical signal to acquire a sampling value, and calculates a threshold value for binarizing the optical signal based on transition of the sampling value; and a determination unit (a threshold value determination unit 37) that binarizes the optical signal based on the threshold value.

The terminal device 30 also further includes:

a list (an optical ID correspondence list 36) describing a correspondence between ID information and authentication information for starting the RF wireless communication;

an analysis unit (an optical ID analysis unit 35) that refers to the list for the ID information acquired by the determination unit binarizing the optical signal to acquire the corresponding authentication information; and an RF transmission and reception unit 33 that transmits the authentication information acquired by the analysis unit to the base station by the RF wireless communication.

The optical sensor information acquisition unit 31 converts the optical signal from the optical transmitter 21 into an electric signal to be acquired as a light illuminance value. The optical sensor information acquisition unit 31 is not limited to an optical receiver dedicated to the optical wireless communication, and if the terminal device 30 is a smart phone, its camera function may be used.

Figure 4:
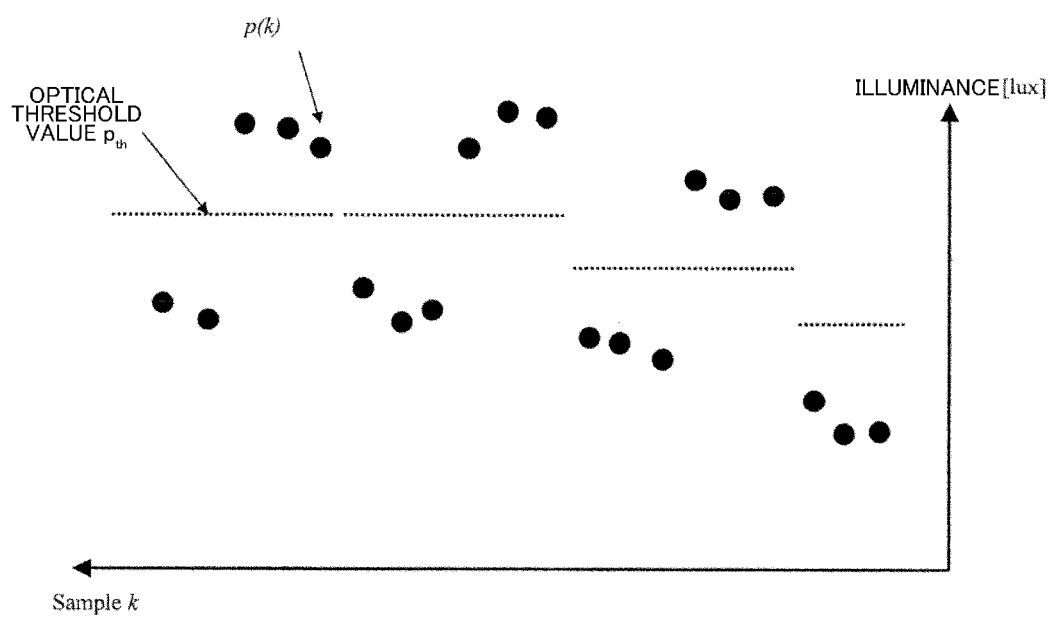
FIG. 4 is an illustration for explaining the illuminance of an optical signal received by the terminal device according to the present invention.

The threshold value calculation unit 38 calculates an optimum threshold value from the light illuminance value acquired by the optical sensor information acquisition unit 31, and inputs the calculated threshold value to the threshold value determination unit 37. FIG. 4 is an illustration for explaining processing performed by the threshold value calculation unit 38. In FIG. 4, p(k) is a sampling value of light illuminance (k is a sampling number), and $p_{th}$ is a threshold value. As illustrated in FIG. 4, the threshold value calculation unit 38 periodically calculates the threshold value $p_{th}$ based on sampling values of illuminance of optical signals. The threshold calculation method will be described later.

Figure 5:
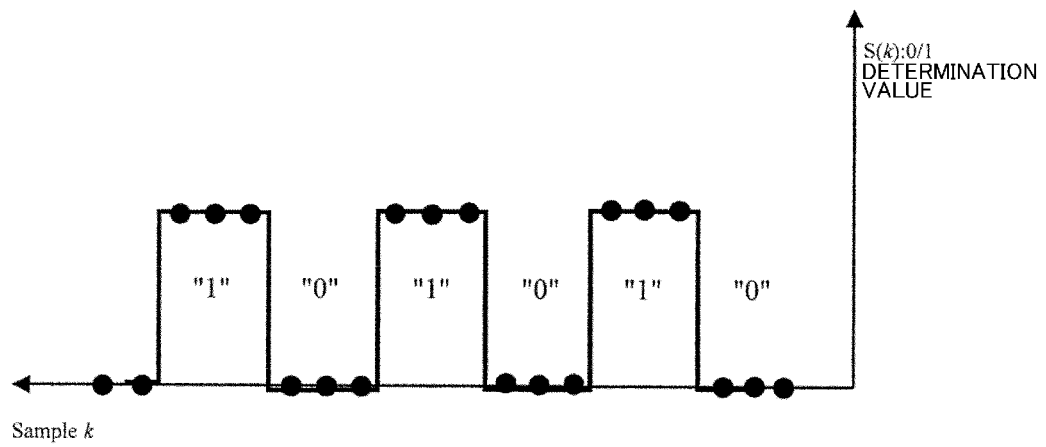
FIG. 5 is an illustration for explaining a signal binarized by a determination unit of the terminal device according to the present invention.

The threshold value determination unit 37 uses the threshold value calculated by the threshold value calculation unit 38 to binarize (1/0) the optical signal received by the optical sensor information acquisition unit 31. FIG. 5 is an illustration for explaining processing performed by the threshold value determination unit 37. The threshold value determination unit 37 determines that S(k)=1 for $p(k) \geq p_{th}$, and determines that S(k)=0 for $p(k) < p_{th}$, thus binarizing the received signal. Here, S(k) is a determination value of 1 or 0 obtained by the threshold value determination unit 37 with respect to the illuminance p(k) of the sampling number k. In other words, since the threshold value calculation unit 38 adaptively changes the threshold value $p_{th}$ according to the light illuminance, even when the position of the terminal device 30 or the light receiving angle changes and the illuminance of the optical signal changes accordingly, the threshold value determination unit 37 can acquire accurate optical ID information.

Figure 6:
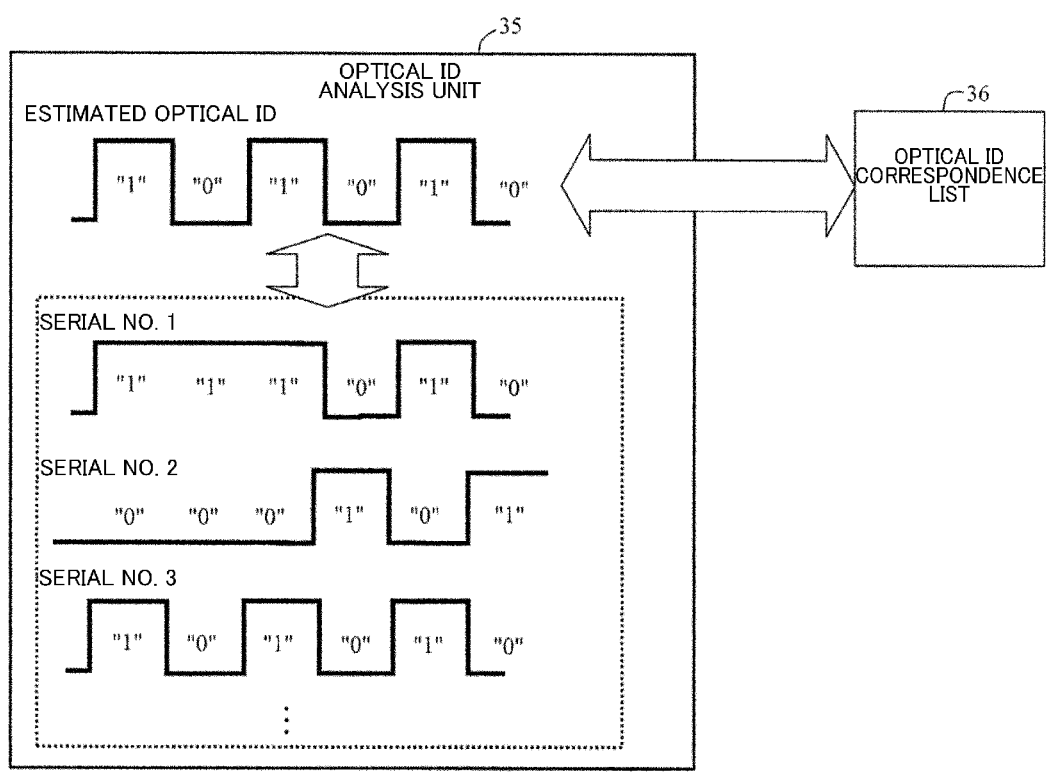
FIG. 6 illustrates processing in an analysis unit of the terminal device according to the present invention.
Figure 8:
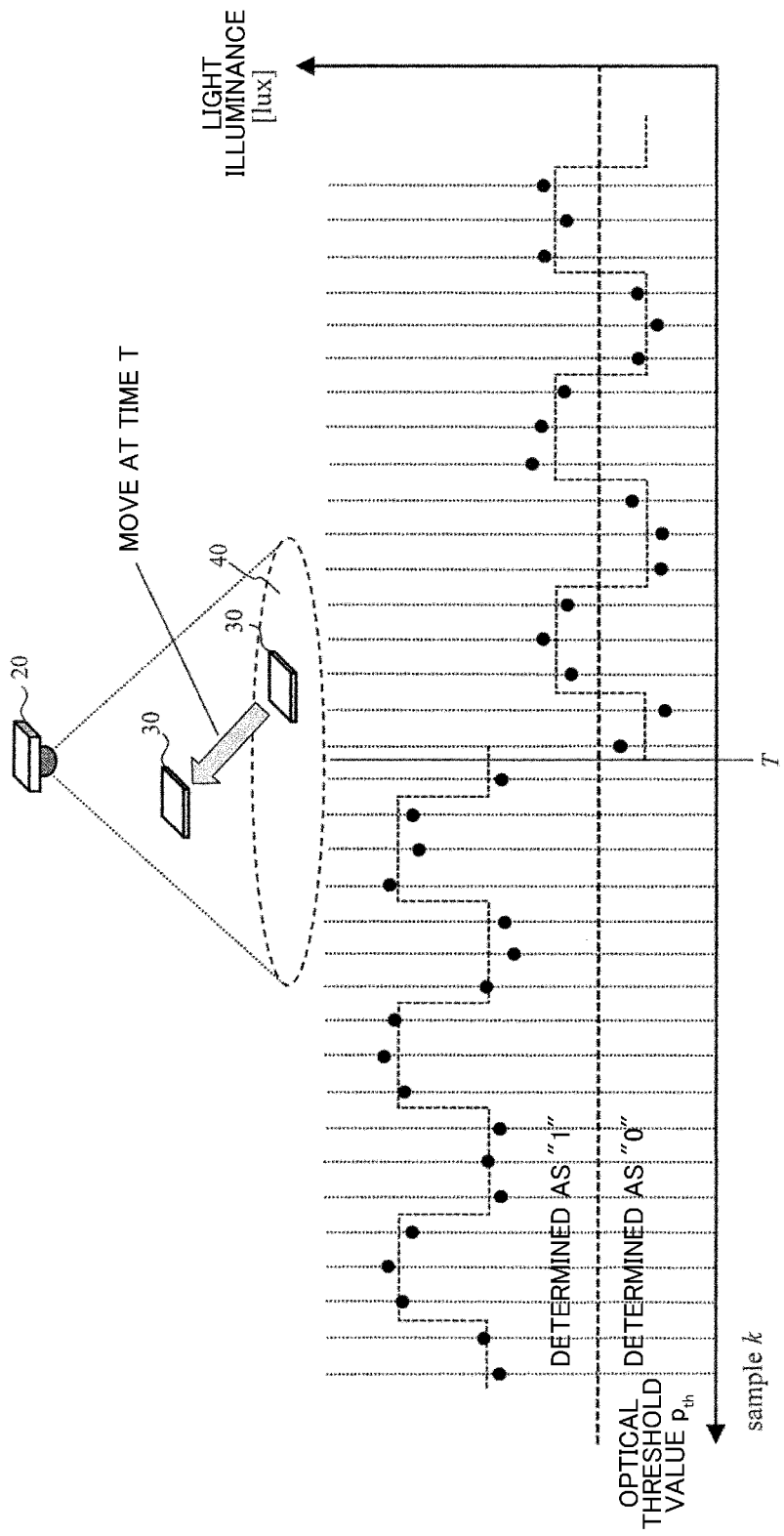
FIG. 8 is an illustration for explaining a problem to be solved by the present invention.

The optical ID analysis unit 35 extracts an optical ID based on the data binarized by the threshold value determination unit 37. FIG. 6 is an illustration for explaining processing performed by the optical ID analysis unit 35. The optical ID analysis unit 35 compares the input binarized data with the stored signal shapes of optical IDs, and extracts an optical ID with the signal shape having the maximum correlation. Subsequently, the optical ID analysis unit 35 refers to the optical ID correspondence list 36 for the optical ID, and selects the corresponding connection operation and authentication information from the optical ID correspondence list 36. The description content of the optical ID correspondence list 36 is the same as that of the optical ID correspondence list 26 of the base station 20. FIG. 7 illustrates an example of the optical ID correspondence list 36.

The RF transmission and reception unit 33 transmits and receives RF wireless signals by using the protocol. That protocol is Wi-Fi, LTE, or the like. For example, a plurality of wireless standards such as 2.4 GHz/5 GHz Wi-Fi may be supported. The RF transmission and reception unit 33 transmits the connection operation and authentication information extracted by the optical ID analysis unit 35 to the base station 20.

[Threshold Calculation Method]

Figure 9:
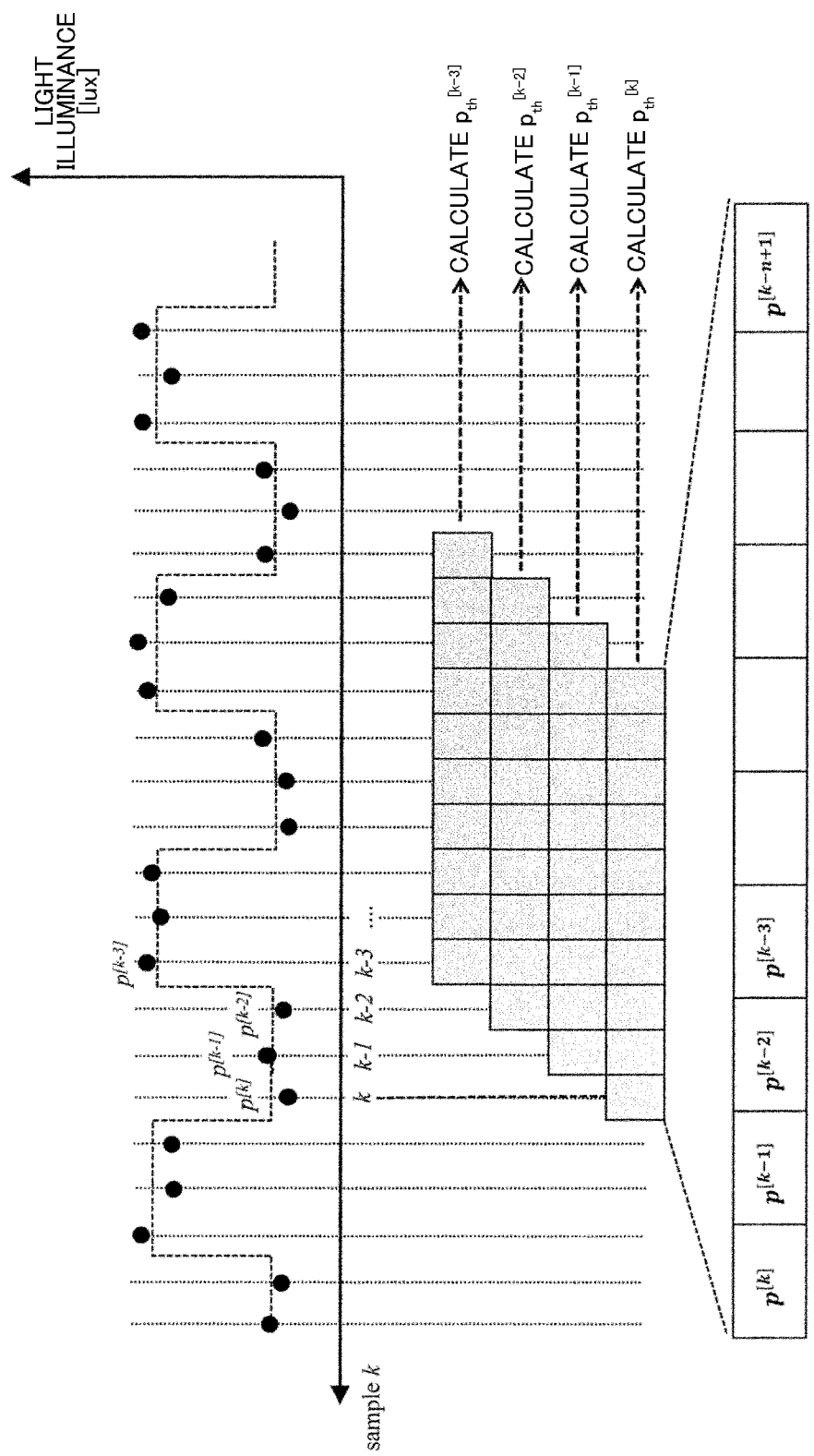
FIG. 9 illustrates processing in a calculation unit of the terminal device according to the present invention.

FIG. 9 is an illustration for explaining the calculation method performed by the threshold value calculation unit 38. FIG. 9 is an image in a threshold value $p_{th}^{[k]}$ for determining a sample k is calculated. The threshold value calculation unit 38 uses n sample values ($p^{[k-n+1]}$ to $p^{[k]}$) sampled in the past to calculate the threshold value $p_{th}^{[k]}$ for determining the sample k. Similarly, the threshold value calculation unit 38 uses n sample values ($p^{[k-n]}$ to $p^{[k-1]}$) sampled in the past to calculate a threshold value $p_{th}^{[k-1]}$ for determining a sample k−1, uses n sample values to $p^{[k-n-1]}$ to $p^{[k-2]}$) sampled in the past to calculate a threshold value $p_{th}^{[k-2]}$ for determining a sample k−2, and so on.

A specific threshold calculation method will be described. Here, $p^{[k]}$ is the illuminance value at the time of sample k, $p_{th}^{[k]}$ is the threshold value at the time of sample k, n is the number of data points used, and a is a smoothing constant.

Example 1: This is an example in which the threshold value calculation unit 38 calculates the threshold value by a moving average method (Formula 1) using a plurality of sampling values sampled in the past.

[Formula 1]

$$p_{th}^{[k]} = \frac{\sum_{j=1}^{j=n} p^{[k-j+1]}}{n} = \frac{p^{[k]} + p^{[k-1]} + \ldots + p^{[k-n+1]}}{n} \quad (1)$$

Example 2: This is an example in which the threshold value calculation unit 38 calculates the threshold value by a weighted average method (Formula 2) using a plurality of sampling values sampled in the past.

[Formula 2]

$$p_{th}^{[k]} = \frac{\sum_{j=1}^{j=n} p^{[k-j+1]}(n-j+1)}{\sum_{j=1}^{j=n}(n-j+1)} = \frac{p^{[k]} \times n + p^{[k-1]} \times (n-1) + \ldots + p^{[k-n+1]} \times 1}{n + (n-1) + \ldots + 2 + 1} \quad (2)$$

Example 3: This is an example in which the threshold value calculation unit 38 calculates the threshold value by an exponential moving average method (Formula 3) using a plurality of sampling values sampled in the past.

[Formula 3]

$$p_{th}^{[k]} = \alpha p^{[k]} + (1-\alpha) p_{th}^{[k-1]} \text{ i.e. } \quad p_{th}^{[k]} = \alpha \{p^{[k]} + (1-\alpha) p^{[k-1]} + \ldots + (1-\alpha)^n p^{[k-n]} + \ldots\} \quad (3)$$

Second Embodiment

Figure 10:
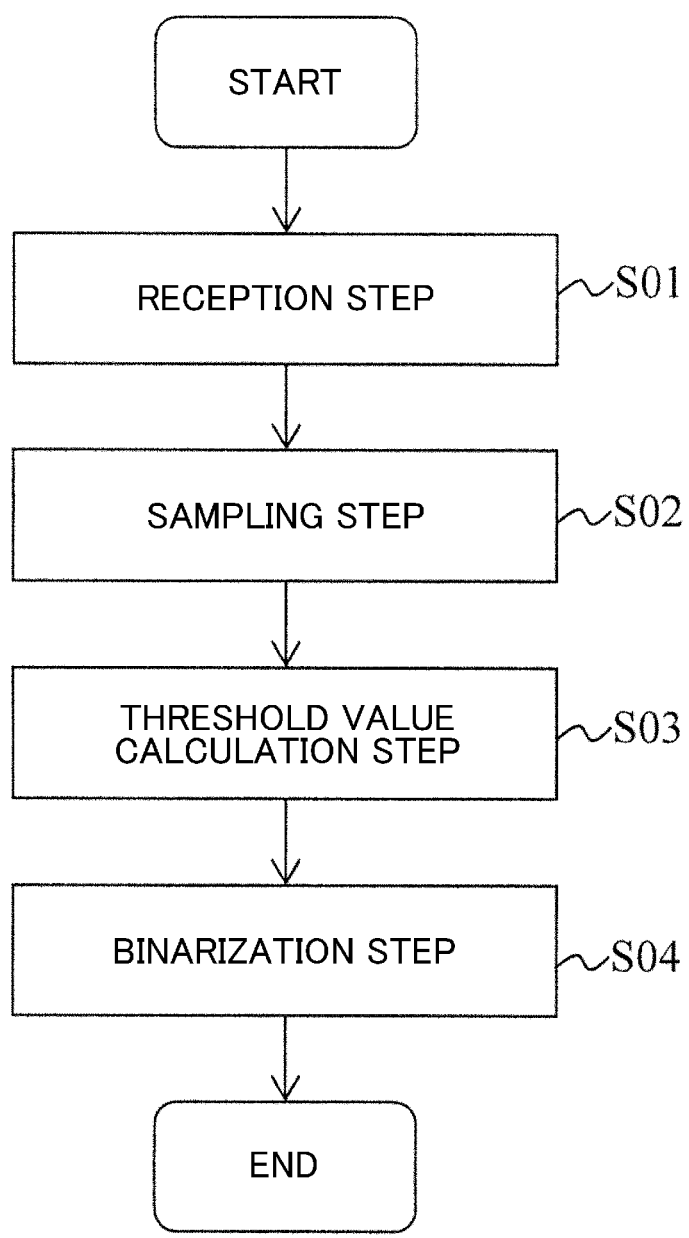
FIG. 10 is a flowchart illustrating a communication method according to the present invention.
Figure 11:
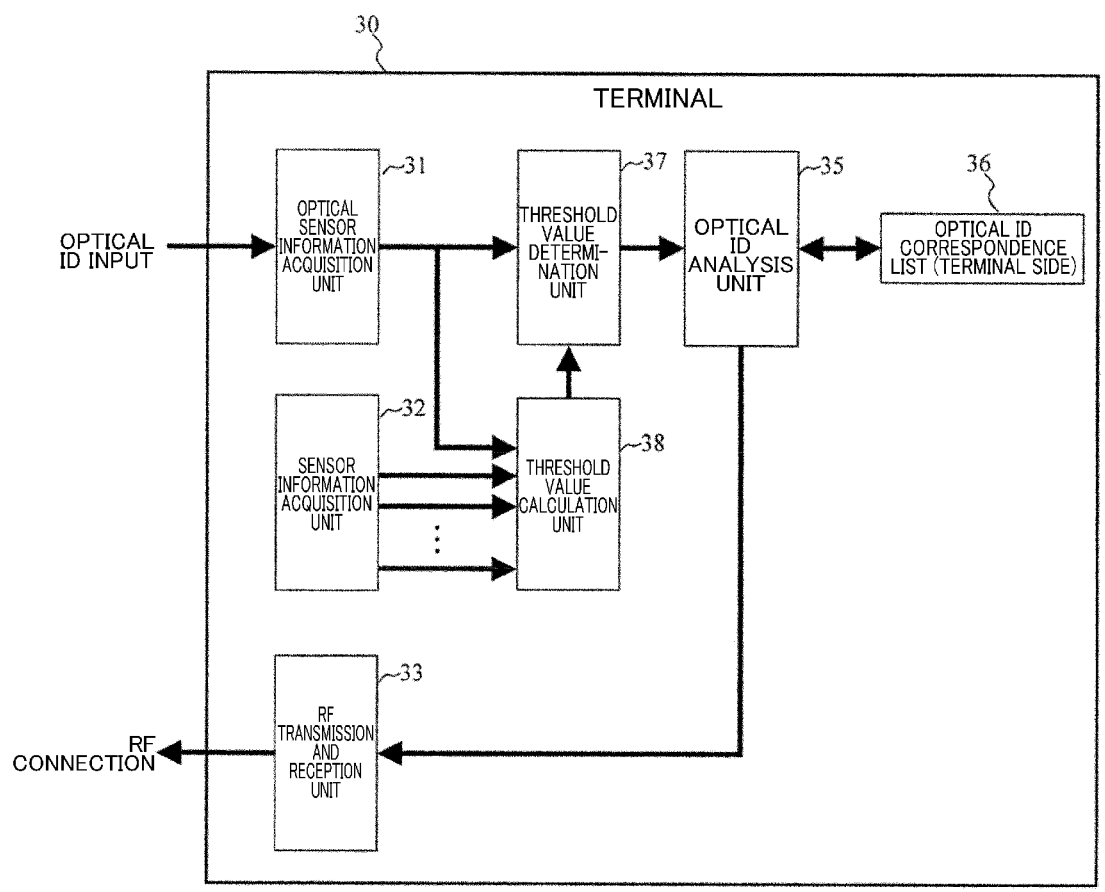
FIG. 11 is a diagram illustrating a configuration of a terminal device of a communication system according to the present invention.

FIG. 10 is a flowchart illustrating an operation (communication method) of the terminal device 30 described in the first embodiment. The present communication method is a communication method in which communication between the terminal device 30 and the base station 20 is performed by an optical wireless communication and an RF wireless communication, the communication method including:

by the terminal device 30,
receiving an optical signal of the optical wireless communication from the base station (step S01);
sampling an illuminance of the optical signal to acquire a sampling value (step S02);
calculating a threshold value for binarizing the optical signal based on transition of the sampling value (step S03); and binarizing the optical signal based on the threshold value (step S04).

In steps S01 and S02, the optical sensor information acquisition unit 31 converts the optical signals from the base station 20 into electric signals to sample optical illuminance values.

In step S03, the threshold value calculation unit 38 calculates an optimum threshold value from the light illuminance values (sampling values) acquired in step S02, and inputs the calculated threshold value to the threshold value determination unit 37. As illustrated in FIG. 4, the threshold value calculation unit 38 periodically calculates the threshold value $p_{th}$ based on sampling values of illuminance of optical signals.

In step S04, the threshold value determination unit 37 uses the threshold value calculated in step S03 to binarize (1/0) the optical signal based on the sampling values acquired in steps S01 and S02. The threshold value determination unit 37 determines that S(k)=1 for $p(k) \geq p_{th}$, and determines that S(k)=0 for $p(k) < p_{th}$, thus binarizing the received signal.

Third Embodiment

FIG. 10 is a diagram illustrating a configuration of a terminal device 30 according to a third embodiment. The terminal device 30 according to the present embodiment further includes a sensor information acquisition unit 32 in the terminal device 30 according to the first embodiment. The sensor information acquisition unit 32 is a sensor that acquires physical information other than the illuminance of the optical signal. Then, the calculation unit (threshold value calculation unit 38) changes the smoothing constant α used in the exponential moving average method based on the sensor information output from the sensor.

Here, the physical information other than the illuminance of the optical signal is information such as the acceleration of the terminal device 30 from an acceleration sensor, the inclination of the terminal device 30 from a gyro sensor, and the direction (orientation) of the terminal device 30 from a magnetic sensor.

The sensor information acquisition unit 32 acquires the physical information and inputs it to the threshold value calculation unit 38. The threshold value calculation unit 38 of the present embodiment uses not only the illuminance of the optical signal but also the physical information to calculate the threshold value. FIG. 12 illustrates an example in which the threshold value calculation unit 38 uses physical information and sets a smoothing constant α in order to calculate the threshold value by an exponential moving average.

The acceleration sensor acquires the acceleration of the terminal device 30 for each of the three axes (x, y, z). The background illuminance value fluctuates as the terminal device 30 moves. Therefore, by setting the smoothing constant α according to the acceleration to Formula 3 as illustrated in FIG. 12, the followability of the threshold value to the fluctuation of the illuminance value can be enhanced. Specifically, when the change in illuminance in the back round is small (when the acceleration is small), a too high a leads to a too high followability of the threshold value to the illuminance, so that it is effective to set a to a moderately small value. On the other hand, when the background illuminance change is large (when the acceleration value is large), a relatively high a makes it possible to enhance the followability of the threshold value to the illuminance.

Note that FIG. 12 is an example, and the set value of a may be flexibly changed in consideration of the illuminance profile (directivity of the light source) of the lighting to be used. Further, the threshold value calculation unit 38 may use sensor information other than that of the acceleration sensor.

[Notes]

The present invention is an improvement of a mechanism for determining a threshold value for binarizing the light illuminance acquired by an illuminance sensor or the like. Specifically, it includes:
(1) A method of setting a threshold value using a moving average method
(2) A method of setting a threshold value using a weighted moving average method
(3) A method of setting a threshold value using an exponential moving average.

Further, it may additionally include
(4) A method of predicting the movement of the terminal device from external information of, for example, a speed sensor and an acceleration sensor mounted on the terminal device to set an optimum threshold value.

Effects of the Invention

According to a communication system that performs connection and authentication control for RF communication by using optical signals, the receiving side uses an illuminance sensor mounted on a terminal device such as a smartphone, so that it is possible to receive correct control information regardless of the position of the terminal device or the light receiving angle.

REFERENCE SIGNS LIST

10 Upper layer network
20 Base station
21 Optical transmission unit
22 RF transmission and reception unit
24 Beam control unit
25 Optical signal control unit
26 Optical ID correspondence list (base station side)
27 Connection and authentication control unit
30 Terminal device
31 Optical sensor information acquisition unit
32 Sensor information acquisition unit
33 RF transmission and reception unit
35 Optical ID analysis unit
36 Optical ID correspondence list (terminal side)
37 Threshold value determination unit
38 Threshold value calculation unit
40 Area

The invention claimed is:

1. A terminal device that communicates with a base station by an optical wireless communication and an RF (Radio Frequency) wireless communication, the terminal device comprising:
an optical sensor that receives an optical signal of the optical wireless communication from the base station;
a calculation unit that samples an illuminance of the optical signal to acquire a sampling value, and calculates a threshold value for binarizing the optical signal based on transition of the sampling value;
a sensor that acquires physical information other than the illuminance of the optical signal,
wherein the calculation unit changes a smoothing constant used in the calculation of the threshold value based on the sensor information output from the sensor; and
a determination unit that binarizes the optical signal based on the threshold value.

2. The terminal device according to claim 1, wherein the calculation unit calculates the threshold value by a moving average method using a plurality of sampling values sampled in the past.

3. The terminal device according to claim 1, wherein the calculation unit calculates the threshold value by a weighted average method using a plurality of sampling values sampled in the past.

4. The terminal device according to claim 1, wherein the calculation unit calculates the threshold value by an exponential moving average method using a plurality of sampling values sampled in the past.

5. The terminal device according to claim 1, further comprising:
a list describing a correspondence between ID information and authentication information for starting the RF wireless communication;
an analysis unit that refers to the list for the ID information obtained by the determination unit binarizing the optical signal to acquire the corresponding authentication information; and
an RF transmission and reception unit that transmits the authentication information acquired by the analysis unit to the base station by the RF wireless communication.

6. A communication method for performing communication between a terminal device and a base station by an optical wireless communication and an RF (Radio Frequency) wireless communication, the communication method comprising:
by the terminal device,
receiving an optical signal of the optical wireless communication from the base station;
sampling an illuminance of the optical signal to acquire a sampling value;
calculating a threshold value for binarizing the optical signal based on transition of the sampling value;
acquiring physical information other than the illuminance of the optical signal;
changing a smoothing constant used in the calculating of the threshold value based on the sensor information output from the sensor; and
binarizing the optical signal based on the threshold value.

7. The communication method according to claim 6, wherein the calculating includes calculating the threshold value by a moving average method using a plurality of sampling values sampled in the past.

8. The communication method according to claim 6, wherein the calculating includes calculating the threshold value by a weighted average method using a plurality of sampling values sampled in the past.

9. The communication method according to claim 6, wherein the calculating includes calculating the threshold value by an exponential moving average method using a plurality of sampling values sampled in the past.

10. A communication system in which communication between a terminal device and a base station is performed by an optical wireless communication and an RF (Radio Frequency) wireless communication, wherein the terminal device includes
- an optical sensor that receives an optical signal of the optical wireless communication from the base station;
- a calculation unit that samples an illuminance of the optical signal to acquire a sampling value, and calculates a threshold value for binarizing the optical signal based on transition of the sampling value;
- a sensor that acquires physical information other than the illuminance of the optical signal,
- wherein the calculation unit changes a smoothing constant used in the calculation of the threshold value based on the sensor information output from the sensor; and
- a determination unit that binarizes the optical signal based on the threshold value.

11. The communication method according to claim 10, wherein the calculating unit calculates the threshold value by a moving average method using a plurality of sampling values sampled in the past.

12. The communication method according to claim 10, wherein the calculating unit calculates the threshold value by a weighted average method using a plurality of sampling values sampled in the past.

13. The communication method according to claim 10, wherein the calculating unit calculates the threshold value by an exponential moving average method using a plurality of sampling values sampled in the past.

14. A terminal device that communicates with a base station by an optical wireless communication and an RF (Radio Frequency) wireless communication, the terminal device comprising:
- an optical sensor that receives an optical signal of the optical wireless communication from the base station;
- a calculation unit that samples an illuminance of the optical signal to acquire a sampling value, and calculates a threshold value for binarizing the optical signal based on transition of the sampling value; and
- a determination unit that binarizes the optical signal based on the threshold value;
- a list describing a correspondence between ID information and authentication information for starting the RF wireless communication;
- an analysis unit that refers to the list for the ID information obtained by the determination unit binarizing the optical signal to acquire the corresponding authentication information; and
- an RF transmission and reception unit that transmits the authentication information acquired by the analysis unit to the base station by the RF wireless communication.

* * * * *